US010638255B2

(12) United States Patent
Lyman et al.

(10) Patent No.: US 10,638,255 B2
(45) Date of Patent: Apr. 28, 2020

(54) PASSIVE DYNAMIC GEOFENCING FOR MOBILE DEVICES

(71) Applicant: eBay Inc., San Jose, CA (US)

(72) Inventors: Nate L Lyman, Livermore, CA (US); Frank Russo, Sunnyvale, CA (US)

(73) Assignee: eBay Inc., San Jose, CA (US)

(*) Notice: Subject to any disclaimer, the term of this patent is extended or adjusted under 35 U.S.C. 154(b) by 0 days.

(21) Appl. No.: 15/702,916

(22) Filed: Sep. 13, 2017

(65) Prior Publication Data
US 2018/0007505 A1 Jan. 4, 2018

Related U.S. Application Data

(63) Continuation of application No. 13/952,812, filed on Jul. 29, 2013, now Pat. No. 9,769,604.
(Continued)

(51) Int. Cl.
H04W 4/021 (2018.01)
H04W 12/06 (2009.01)
H04W 4/50 (2018.01)
H04W 4/029 (2018.01)
H04B 7/0413 (2017.01)
(Continued)

(52) U.S. Cl.
CPC .......... *H04W 4/021* (2013.01); *H04B 7/0413* (2013.01); *H04B 7/0417* (2013.01); *H04B 7/0602* (2013.01); *H04W 4/022* (2013.01); *H04W 4/029* (2018.02); *H04W 4/50* (2018.02); *H04W 12/06* (2013.01)

(58) Field of Classification Search
CPC ... H04W 4/021; H04W 64/003; H04W 4/029; H04W 84/12; H04W 48/04; H04W 64/00; H04B 7/0413; H04B 7/0417; H04B 7/0608
USPC .............................. 455/456.3, 404.1, 456.1
See application file for complete search history.

(56) References Cited

U.S. PATENT DOCUMENTS 6,259,381 B1 7/2001 Small
7,519,470 B2 4/2009 Brasche et al.
(Continued)

FOREIGN PATENT DOCUMENTS

CA 2850250 A1 9/2012
CN 101405572 4/2009
(Continued)

OTHER PUBLICATIONS

Response to Office Action filed on Jun. 8, 2018, for Korean Patent Application No. 10-2014-7030253, dated Apr. 10, 2018, 12 pages (4 pages of English Pending Claims and 8 pages of Official Copy).
(Continued)

*Primary Examiner* — Fred A Casca
(74) *Attorney, Agent, or Firm* — SBMC

(57) ABSTRACT

Systems and methods for passive dynamic geofencing on a mobile device are discussed. For example, a method for passive dynamic geofencing can include operations such as monitoring a first parent geofence and a first plurality of child geofences; detecting crossing a boundary of the first parent geofence into a second parent geofence; loading the second parent geofence and a second plurality of child geofences encompassed by the second parent geofence; and monitoring the second parent geofence and the second plurality of child geofences.

20 Claims, 10 Drawing Sheets

Related U.S. Application Data

(60) Provisional application No. 61/692,173, filed on Aug. 22, 2012.

(51) Int. Cl.
*H04B 7/0417* (2017.01)
*H04B 7/06* (2006.01)

(56) References Cited

U.S. PATENT DOCUMENTS

| | | | |
|---|---|---|---|
| 7,848,765 B2 | 12/2010 | Phillips et al. | |
| 8,489,127 B2 | 7/2013 | Huang et al. | |
| 8,509,803 B2 | 8/2013 | Gracieux | |
| 9,769,604 B2 | 9/2017 | Lyman et al. | |
| 2002/0107029 A1 | 8/2002 | Caughran et al. | |
| 2003/0070158 A1* | 4/2003 | Lucas | G06F 8/34 717/114 |
| 2004/0090950 A1* | 5/2004 | Lauber | H04Q 9/00 370/352 |
| 2007/0143013 A1 | 6/2007 | Breen | |
| 2008/0162034 A1 | 7/2008 | Breen | |
| 2009/0164118 A1* | 6/2009 | Breen | G01S 5/0027 701/408 |
| 2010/0048222 A1 | 2/2010 | Gracieux | |
| 2011/0111859 A1 | 5/2011 | Fiedler | |
| 2011/0256881 A1 | 10/2011 | Huang et al. | |
| 2012/0042036 A1 | 2/2012 | Lau et al. | |
| 2012/0172027 A1 | 7/2012 | Partheesh et al. | |
| 2012/0284769 A1 | 11/2012 | Dixon et al. | |
| 2012/0295639 A1* | 11/2012 | Fitoussi | H04W 4/021 455/456.3 |
| 2013/0018705 A1 | 1/2013 | Heath et al. | |
| 2013/0093627 A1* | 4/2013 | Cosman | H04W 64/00 342/451 |
| 2013/0173736 A1 | 7/2013 | Krzeminski et al. | |
| 2013/0178233 A1* | 7/2013 | McCoy | H04W 4/021 455/456.3 |
| 2013/0317938 A1* | 11/2013 | Zhao | G06Q 30/0207 705/26.8 |
| 2013/0326137 A1 | 12/2013 | Bilange et al. | |
| 2014/0057648 A1 | 2/2014 | Lyman et al. | |

FOREIGN PATENT DOCUMENTS

| | | |
|---|---|---|
| CN | 101895816 | 11/2010 |
| CN | 102244836 | 11/2011 |
| CN | 102291435 A | 12/2011 |
| CN | 104160728 A | 11/2014 |
| WO | 2010/080938 A2 | 7/2010 |
| WO | 2014/031906 A1 | 2/2014 |

OTHER PUBLICATIONS

Response to Office Action filed on Dec. 21, 2017 for Canadian Patent No. 2,861,826 dated Jun. 29, 2017, 4 pages.
First Examination Report Received for Australian Patent No. 2013305696, dated Mar. 4, 2015, 3 pages.
Response to First Examination Report filed on Jun. 29, 2015 for Australian Patent No. 2013305696, dated Mar. 4, 2015, 8 pages.
Office Action Received for Korean Patent Application No. 10-2014-7030253, dated Apr. 10, 2018, 4 pages (1 page of English Copy and 3 pages of Official Copy).
"System: Definition for system in the Oxford dictionary", Retrieved from the Internet <URL: www.oxforddictionaries.com/us/definition/american_english/system?searchDictCode=all> (retrieved on Feb. 13, 2015), Feb. 21, 2008, 3 pages.
Friedman-Hill, "Jess, the Rule Engine for the Java Platform", Retrieved from the Internet <URL: www.jessrules.com> retrieved on Feb. 12, 2015, 1 page.
Subsequent Examiners Report received for Australian Patent Application No. 2013305696, dated Sep. 15, 2015, 4 pages.
Examiner Interview Summary received for U.S. Appl. No. 13/952,812, dated Jan. 9, 2015, 5 pages.
Final Office Action received for U.S. Appl. No. 13/952,812, dated Jan. 8, 2016, 37 pages.
Final Office Action received for U.S. Appl. No. 13/952,812, dated Feb. 26, 2015, 29 pages.
Non-Final Office Action received for U.S. Appl. No. 13/952,812, dated Jul. 8, 2015, 33 pages.
Non-Final Office Action received for U.S. Appl. No. 13/952,812, dated Sep. 26, 2016, 42 pages.
Non-Final Office Action received for U.S. Appl. No. 13/952,812, dated Oct. 27, 2014, 32 pages.
Notice of Allowance received for U.S. Appl. No. 13/952,812, dated May 12, 2017, 10 pages.
Response to Non-Final Office Action filed on Jan. 11, 2017, for U.S. Appl. No. 13/952,812, dated Sep. 26, 2016, 12 pages.
Response to Final Office Action filed May 26, 2015 on, for U.S. Appl. No. 13/952,812, dated Feb. 26, 2015, 28 pages.
Response to Non-Final Office Action filed Oct. 5, 2015 on, for U.S. Appl. No. 13/952,812, dated Jul. 8, 2015, 17 pages.
Response to Non-Final Office Action filed Dec. 29, 2014 on, for U.S. Appl. No. 13/952,812, dated Oct. 27, 2014, 18 pages.
Response to Final Office Action filed Jun. 8, 2016 on, for U.S. Appl. No. 13/952,812, dated Jan. 8, 2016, 11 pages.
Response to Subsequent Examiners Report filed Jan. 19, 2016 on, for Australian Patent Application No. 2013305696, dated Sep. 15, 2015, 26 pages.
Examiner Interview Summary received for U.S. Appl. No. 13/952,812, dated Aug. 26, 2015, 3 pages.
Office Action received for Canadian Patent Application No. 2,861,826, dated Jun. 29, 2017, 4 pages.
Office Action received for Canadian Patent Application No. 2,861,826, dated Jul. 7, 2015, 3 pages.
Office Action received for Canadian Patent Application No. 2,861,826, dated Aug. 23, 2016, 4 pages.
Response to Office Action filed on Jan. 4, 2016, for Canadian Patent Application No. 2,861,826, dated Jul. 7, 2015, 25 pages.
Response to Office Action filed on Feb. 17, 2017, for Canadian Patent Application No. 2,861,826, dated Aug. 23, 2016, 24 pages.
Response to Office Action filed on Oct. 16, 2017, for Chinese Patent Application No. 201380011053.7, dated Jun. 2, 2017, 13 pages.
Office Action received for Chinese patent Application No. 201380011053.7, dated Jun. 2, 2017, 27 pages (Including English Translation).
Extended European Search Report for European Patent Application No. 17167040.9, dated Aug. 11, 2017, 8 pages.
International Preliminary Report on Patentability received for PCT Application No. PCT/US2013/056284, dated Mar. 5, 2015, 8 pages.
International Search Report received for PCT Application No. PCT/US2013/056284, dated Feb. 5, 2014, 4 pages.
Written Opinion received for PCT Application No. PCT/US2013/056284, dated Feb. 5, 2014, 5 pages.
Notice of Allowance received for Korean Patent Application No. 10-2018-7030731, dated Jul. 3, 2019, 3 pages (2 pages of Official copy and 1 page of English Translation).
Communication under Rule 71(3) received for European Patent Application No. 17167040.9, dated Jul. 10, 2019, 47 pages.
"Foreign Office Action", CN Application No. 201810154506.6, dated Dec. 18, 2019, 13 pages.
"Extended European Search Report", EP Application No. 19194934.6, dated Nov. 8, 2019, 9 pages.

* cited by examiner

PASSIVE DYNAMIC GEOFENCING FOR MOBILE DEVICES

CLAIM OF PRIORITY

This application is a continuation of U.S. application Ser. No. 13/952,812, filed Jul. 29, 2013, which is hereby incorporated by reference in its entirety.

CLAIM OF PRIORITY

This application claims the benefit of U.S. Provisional Application Ser. No. 61/692,173, titled PASSIVE DYNAMIC GEOFENCING FOR MOBILE DEVICES, filed Aug. 22, 2012, which is incorporated herein by reference in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2012, eBay, Inc. All Rights Reserved.

TECHNICAL FIELD

This application relates generally to data processing within a network-based system operating over a distributed network or data processing on a mobile device, and more specifically to systems and methods for implementing passive dynamic geofencing for mobile devices.

BACKGROUND

The ever increasing use of smart phones, such as the iPhone® (from Apple, Inc. of Cupertino Calif.), with data connections and location determination capabilities is slowly changing the way people interact, shop for products and services, and even manage accounts. Smart phones can provide users with nearly instant information regarding a wide range of information, such as product availability, friend locations, or pricing. For example, applications such as RedLaser™ (from eBay, Inc. of San Jose, Calif.) allow a smart phone user to scan a bar code and instantly check prices across online and local retail outlets. Smart phones also commonly include mechanisms, such as global positioning system (GPS) receivers, that allow the devices to constantly update location information. These technology changes are also driving changes in the way groups of people interact and exchange information.

BRIEF DESCRIPTION OF THE DRAWINGS

Some embodiments are illustrated by way of example and not limitation in the figures of the accompanying drawings in which.

DEFINITIONS

Figure 1:
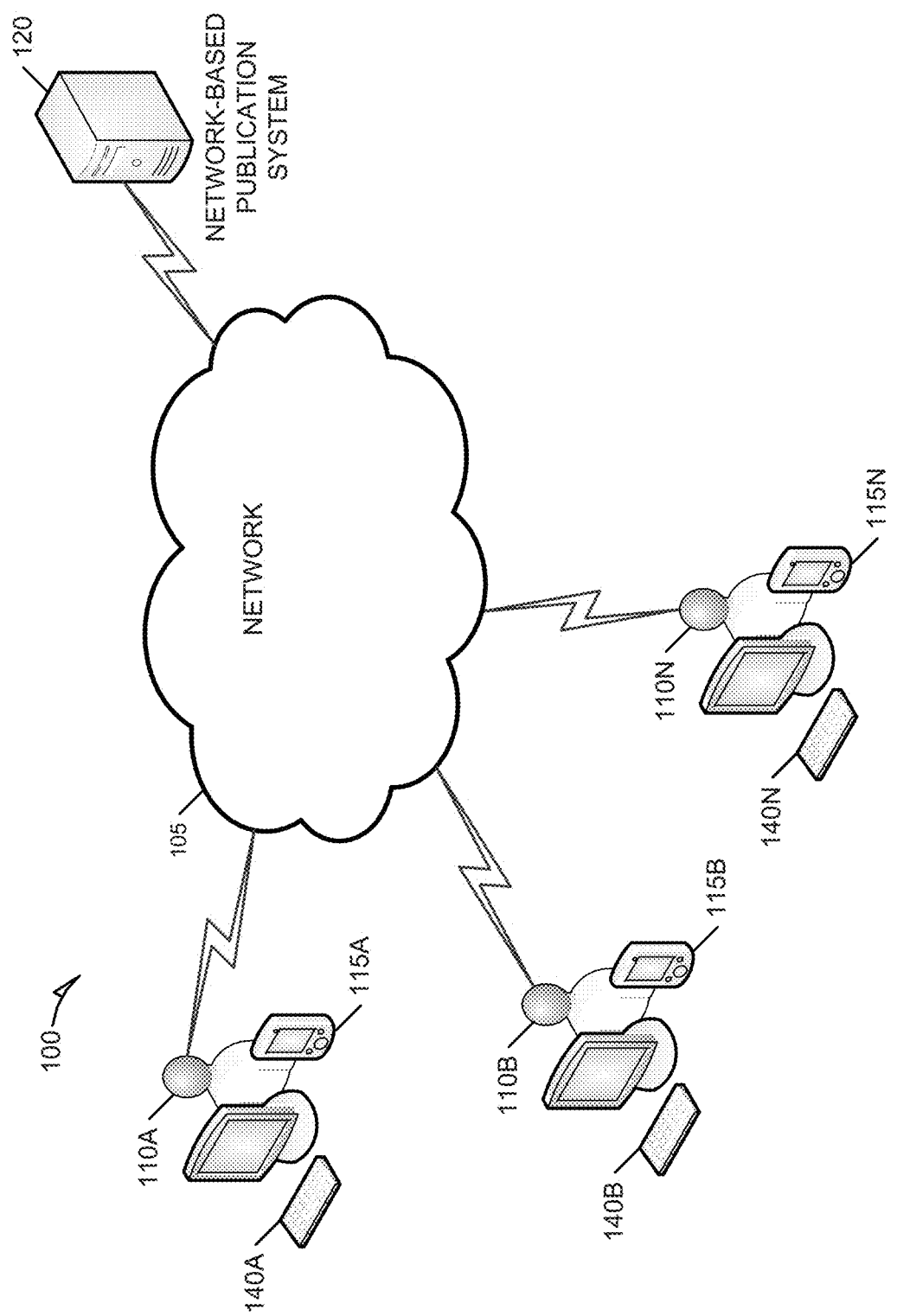
FIG. 1 is a block diagram depicting a system 100 for enabling passive dynamic geofencing on a mobile device, according to an example embodiment.

Location—For the purposes of this specification and the associated claims, the term "location" is used to refer to a geographic location, such as a longitude/latitude combination or a street address. The term location is also used within this specification in reference to a physical location associated with an event, such as a vacation destination.

Real-time—For the purposes of this specification and the associated claims, the term "real-time" is used to refer to calculations or operations performed on-the-fly as events occur or input is received by the operable system. However, the use of the term "real-time" is not intended to preclude operations that cause some latency between input and response, so long as the latency is an unintended consequence induced by the performance characteristics of the machine.

Context—For the purposes of this specification and the associated claims, the term "context" is used to refer to environmental inputs, such as location, time, and weather conditions, among others. The context generally refers to conditions describing an individual's (e.g., user's) environment and/or activities. For example, context information can include a user's location, direction of movement, current activity (e.g., working, driving, playing golf, shopping, etc.), current weather conditions, time of day, and time of year (e.g., season), among other things. In certain examples, context information about a user can also include past events, purchase history, or other historical data about the user.

DETAILED DESCRIPTION

Example systems and methods for using passive dynamic geofencing on a mobile device are described, among other things. Also described are systems and methods for generating and utilizing passive dynamic geofencing on a mobile device. In some example embodiments, the systems and methods for enabling passive dynamic geofencing on a mobile device allow a mobile device to seamlessly monitor an unlimited number of geofences. In some examples, a location-aware smart phone application can monitor an unlimited number of geofences while only maintaining a small number of geofences in memory at a given time. In the following description, for purposes of explanation, numerous specific details are set forth in order to provide a thorough understanding of example embodiments. It will be evident, however, to one skilled in the art, that the present invention may be practiced without these specific details. It will also be evident that passive dynamic geofencing on a mobile device is not limited to the examples provided and may include other scenarios not specifically discussed.

Geofences can be used on a location-aware mobile device to detect when a user of the mobile device enters a specific location, such as a specific retail store. Geofences can be defined in terms of Global Positioning System (GPS) coordinates (e.g., latitude and longitude) combined with a radius measured in meters or feet, for example. Alternatively, geofences can also be defined according a series of GPS coordinates defining a bounding box. In yet other examples, a geofence can be any geometric shape defined by a mathematical formula and anchored by a GPS coordinate.

Mobile devices, such as an iPhone® (from Apple, Inc. of Cupertino, Calif.) can only monitor a limited number of geofences at a given time. Additionally, applications running on a mobile device commonly can only update monitored geofences when the application is opened by a user (or at least active in memory on the mobile device).

In order to overcome the limitation of only being able to monitor a limited number of geofences, a concept of geofence paging has been developed. Geofence paging can also provide a benefit of limiting the amount of memory required within a mobile device for monitoring and maintaining geofences. For example, a mobile device operating according to an embodiment can monitor 10 geofences at any given time (please note, 10 is an arbitrary number and is not intended to limit the systems and methods disclosed herein). Nine of the monitored geofences are assigned to specific geographical locations of interest (e.g., a retail store), while the $10^{th}$ geofence geographically encircles the other nine. In some examples, the nine smaller geofences are referred to as child geofences with the large encompassing geofence referred to as a parent geofence. In yet other examples, the 10 geofences may be referred to as a page of geofences, with the large geofence describing the boundaries of the page and the smaller geofences located within the page.

In an example, the mobile device moves outside of the parent geofence (geofence number 10 in the example above), the mobile device can load a new parent geofence and a plurality of child geofences associated with the parent geofence. Using the page metaphor, when the mobile device moves outside of the parent geofence, the mobile device can load the child geofences. In an example, a user may wish to monitor coffee house locations. Within a large metropolitan area there are likely to be a large number of coffee houses. Accordingly, a service provider system can split up the metropolitan area into a series of parent geofences that each contains a manageable number of coffee houses, each of which may be assigned to a child geofence. A mobile device attempting to monitor geofences assigned to the geographic location and/or proximity of each coffee house can contact the service provider system to request a set of geofences based on a current location. Based on the request, the service provider system can access the parent geofence that includes the current location of the mobile device and send the parent geofence and all child geofences defined within the parent, where each child geofence represents a specific coffee house location. As the mobile device moves about the metropolitan area, the mobile device can detect when its current location exits the parent geofence. When the mobile device moves outside the currently monitored parent geofence, the mobile device can request a new parent (e.g., the next page of geofences) from the service provider. Thus, the mobile device can seamlessly monitor a large number of discrete locations (e.g., individual geofences or child geofences) without needing to maintain all of the child geofences in memory or on the mobile device. In another example, the various parent and child geofences can be stored on the mobile device and only loaded into active memory as they are needed, based on the current location of the mobile device.

Example System

FIG. 1 is a block diagram depicting a system 100 for enabling passive dynamic geofencing on a mobile device, according to an example embodiment. In an example, system 100 can include users 110A-110N (collectively referred to as either user 110 or users 110 depending upon context) and a network-based publication system 120. In an example, the users 110A-110N can connect to the network-based publication system 120 via mobile devices 115A-115N (collectively referred to as mobile device 115). Users 110A-110N can also connect to the network-based publication system 120 via clients 140A-140N (collectively referred to as client 140 or clients 140).

In an example, the users 110 can configure an account on the network-based publication system 120. The account can be accessed by each user, such as user 110A, using mobile device 115A or client 140A, if user 110A meets the specified access criteria or rules. In an example, the access rules can include user identification and location identification rules (e.g., user must be located within a location supported by the network-based publication system 120. A user account on the network-based publication system 120 can allow the user to define specific locations of interest for monitoring via geofences. In some examples, the network-based publication system 120 can monitor user behavior and create geofences based on past and predicted user behaviors. In certain examples, the network-based publication system 120 can be used by merchants as a location-based advertising platform, where users, such as users 110, opt-in to location-based advertisements. For example, Best Buy (of Minneapolis, Minn.) may use the network-based publication system 120 to provide location-based advertising to users 110 via mobile devices 115. In this example, a series of parent geofences may be generated each encompassing a manageable number of geographically related Best Buy store locations. Each of the Best Buy store locations would be covered by a much smaller child geofence that enables the network-based publication system 120 to serve location-based advertising relevant to the specific Best Buy store only if one of the users 110 is in geographic proximity to the Best Buy store (based on the mobile device 115 detecting a location within one of the monitored child geofences).

In another example, a location-aware smart phone application running on the mobile device 115 can trigger predefined tasks based on detecting presence within a child geofence.

Example Operating Environment

Figure 2:
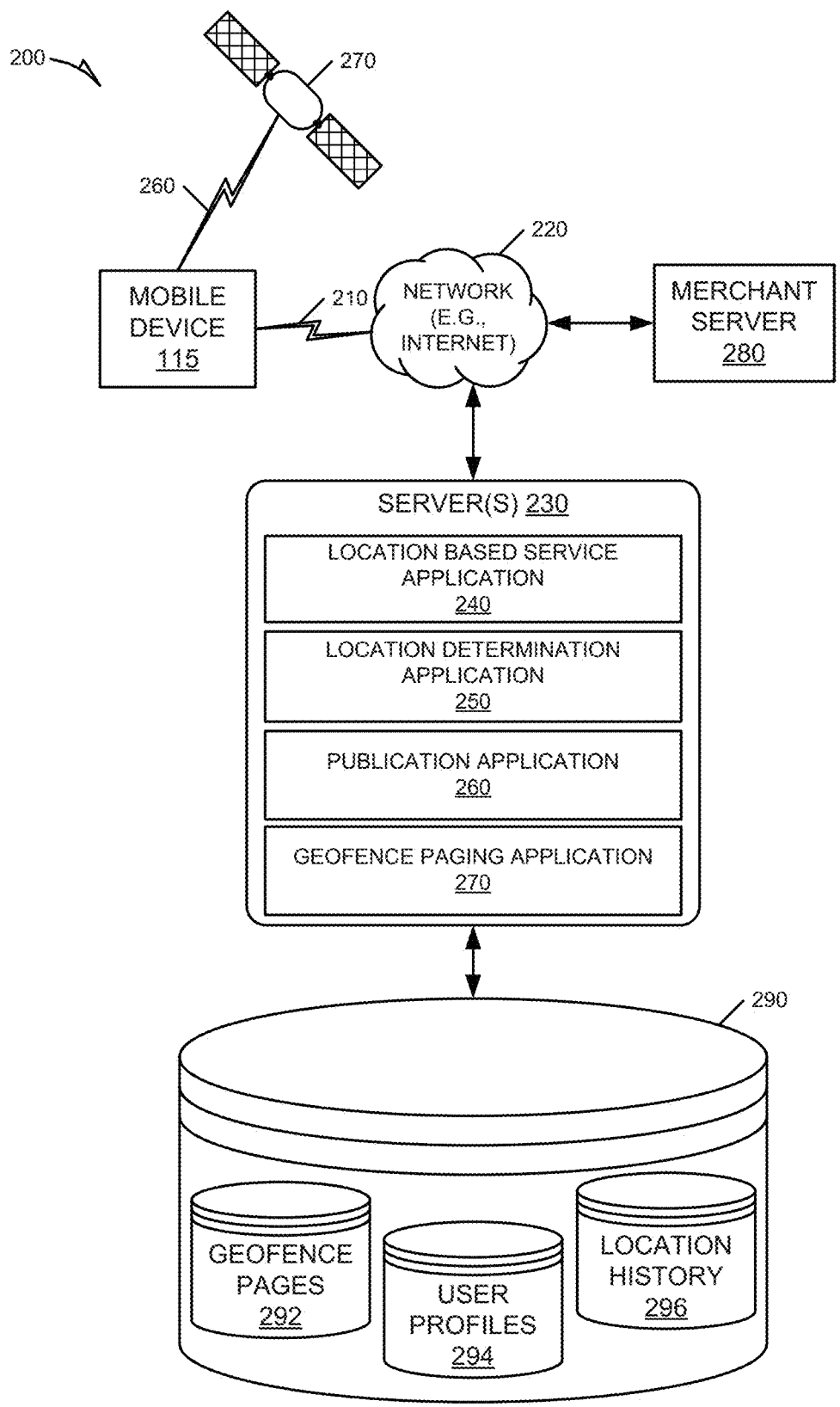
FIG. 2 is a block diagram illustrating an environment for operating a mobile device, according to an example embodiment.

FIG. 2 is a block diagram illustrating an environment 200 for operating a mobile device 115, according to an example embodiment. The environment 200 is an example environment within which methods for using passive dynamic geofences can be implemented. The environment 200 can include a mobile device 115, a communication connection 210, a network 220, servers 230, a communication satellite 270, a merchant server 280, and a database 290. The servers 230 can optionally include location based service application 240, location determination application 250, publication application 260, and geofence paging application 270. The database 290 can optionally include geofence pages 292, user profiles 294, and/or location history 296. The mobile device 115 represents one example device that can be utilized by a user to monitor an unlimited number of locations via passive dynamic geofencing. The mobile device 115 may be any of a variety of types of devices (for example, a cellular telephone, a PDA, a Personal Navigation Device (PND), a handheld computer, a tablet computer, a notebook computer, or other type of movable device). The mobile device 115 may interface via a connection 210 with a communication network 220. Depending on the form of the mobile device 115, any of a variety of types of connections 210 and communication networks 220 may be used.

For example, the connection 210 may be Code Division Multiple Access (CDMA) connection, a Global System for Mobile communications (GSM) connection, or other type of cellular connection. Such connection 210 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, or other data transfer technology (e.g., fourth generation wireless, 4G networks). When such technology is employed, the communication network 220 may include a cellular network that has a plurality of cell sites of overlapping geographic coverage, interconnected by cellular telephone exchanges. These cellular telephone exchanges may be coupled to a network backbone (for example, the public switched telephone network (PSTN), a packet-switched data network, or other types of networks).

In another example, the connection 210 may be Wireless Fidelity (Wi-Fi, IEEE 802.11x type) connection, a Worldwide Interoperability for Microwave Access (WiMAX) connection, or another type of wireless data connection. In such an embodiment, the communication network 220 may include one or more wireless access points coupled to a local area network (LAN), a wide area network (WAN), the Internet, or other packet-switched data network.

In yet another example, the connection 210 may be a wired connection, for example an Ethernet link, and the communication network may be a LAN, a WAN, the Internet, or other packet-switched data network. Accordingly, a variety of different configurations are expressly contemplated.

A plurality of servers 230 may be coupled via interfaces to the communication network 220, for example, via wired or wireless interfaces. These servers 230 may be configured to provide various types of services to the mobile device 115. For example, one or more servers 230 may execute location based service (LBS) applications 240, which interoperate with software executing on the mobile device 115, to provide LBSs to a user. LBSs can use knowledge of the device's location, and/or the location of other devices, to provide location-specific information, recommendations, notifications, interactive capabilities, and/or other functionality to a user. For example, an LBS application 240 can provide location data to a network-based publication system 120, which can then be used to provide access to a group account on the network-based publication system 120. Knowledge of the device's location, and/or the location of other devices, may be obtained through interoperation of the mobile device 115 with a location determination application 250 executing on one or more of the servers 230. Location information may also be provided by the mobile device 115, without use of a location determination application, such as application 250. In certain examples, the mobile device 115 may have some limited location determination capabilities that are augmented by the location determination application 250. In some examples, the servers 230 can also include publication application 260 for providing location-aware publication of data, such as advertisements or offers. In certain examples, location data can be provided to the publication application 260 by the location determination application 250. In some examples, the location data provided by the location determination application 250 can include merchant information (e.g., identification of a retail location). In certain examples, the location determination application 250 can receive signals via the network 220 to further identify a location. For example, a merchant may broadcast a specific IEEE 802.11 service set identifier (SSID) that can be interpreted by the location determination application 250 to identify a particular retail location. In another example, the merchant may broadcast an identification signal via radio-frequency identification (RFID), near-field communication (NFC), or a similar protocol that can be used by the location determination application 250. In addition to examples using these various mechanisms to identify a particular location, these mechanisms (e.g., SSIDs, RFIDs, NFC, and so forth) can be used as secondary authentication factors, which are discussed in more detail below.

In certain examples, the geofence paging application 270 can leverage the LBS application 240 or the location determination application 250 to assist in determining which page of geofences to transmit to the mobile device 115.

Example Mobile Device

Figure 3:
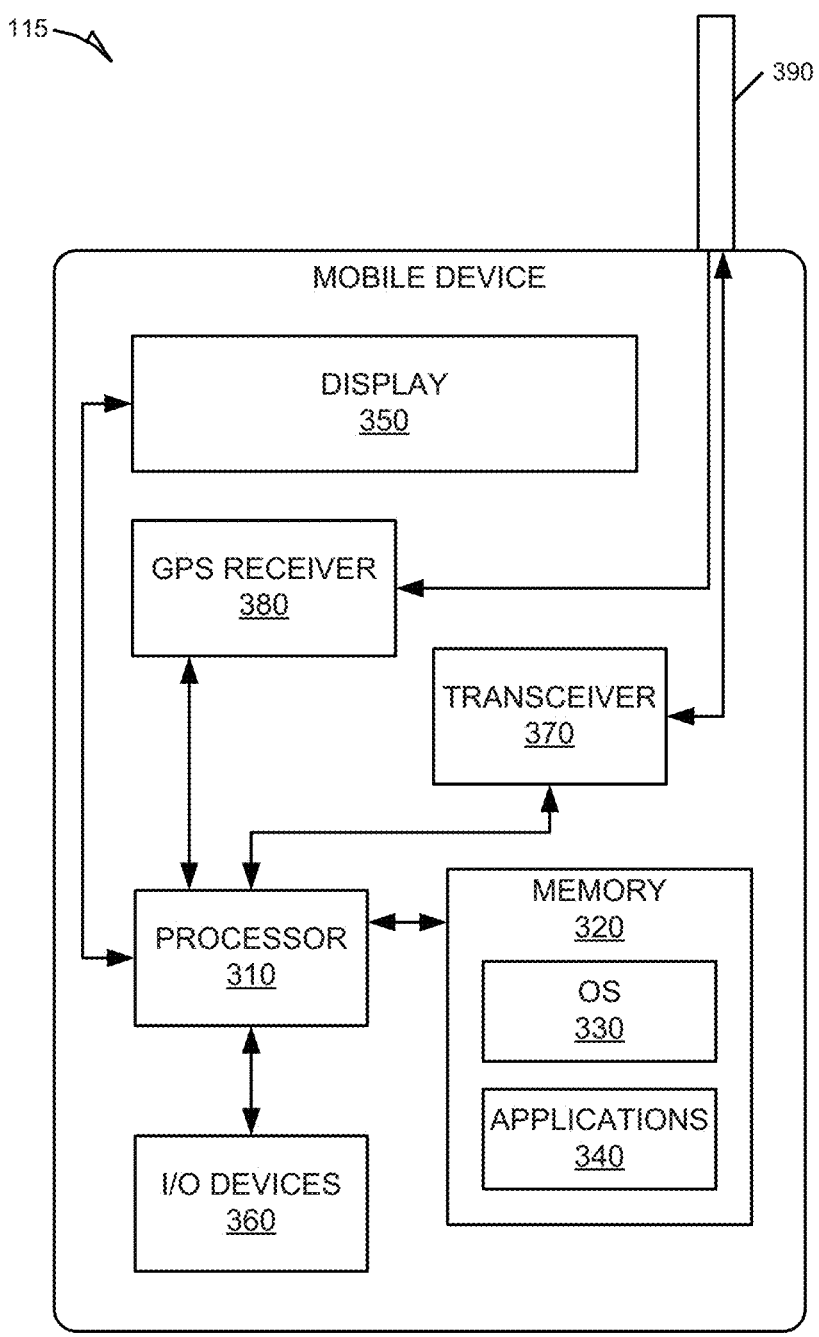
FIG. 3 is a block diagram illustrating a mobile device, according to an example embodiment.

FIG. 3 is a block diagram illustrating the mobile device 115, according to an example embodiment. The mobile device 115 may include a processor 310. The processor 310 may be any of a variety of different types of commercially available processors suitable for mobile devices (for example, an XScale architecture microprocessor, a Microprocessor without Interlocked Pipeline Stages (MIPS) architecture processor, or another type of processor). A memory 320, such as a Random Access Memory (RAM), a Flash memory, or other type of memory, is typically accessible to the processor. The memory 320 may be adapted to store an operating system (OS) 330, as well as application programs 340, such as a mobile location enabled application that may provide LBSs to a user. In certain examples, the application programs 340 can include instructions to implement passive dynamic geofencing, by retrieving and monitoring parent and child geofences as necessary based on location information. The processor 310 may be coupled, either directly or via appropriate intermediary hardware, to a display 350 and to one or more input/output (I/O) devices 360, such as a keypad, a touch panel sensor, a microphone, and the like. Similarly, in some embodiments, the processor 310 may be coupled to a transceiver 370 that interfaces with an antenna 390. The transceiver 370 may be configured to both transmit and receive cellular network signals, wireless data signals, or other types of signals via the antenna 390, depending on the nature of the mobile device 115. In this manner, the connection 210 with the communication network 220 may be established. Further, in some configurations, a GPS receiver 380 may also make use of the antenna 390 to receive GPS signals.

Additional detail regarding providing and receiving location-based services can be found in U.S. Pat. No. 7,848,765, titled "Location-Based Services," granted to Phillips et al. and assigned to Where, Inc. of Boston, Mass., which is hereby incorporated by reference.

An example geo-location concept discussed within U.S. Pat. No. 7,848,765 is a geofence. A geofence can be defined as a perimeter or boundary around a physical location or mobile object (e.g., a user). A geofence can be as simple as a radius around a physical location defining a circular region around the location. However, a geofence can be any geometric shape or an arbitrary boundary drawn on a map. A geofence can be used to determine a geographical area of interest for the calculation of demographics, advertising, or similar purposes. Geofences can be used in conjunction with the offer generation and delivery concepts discussed herein. For example, a geofence can be used to assist in determining whether a user (or mobile device associated with the user) is within a geographic area of interest (e.g., target location) to providing access to a group account. If the user is within a geofence established by provisioning of a group account, the systems discussed herein can use that information to authorize the user to access the group account, such as authorizing the user to process a payment against a group payment account.

Example Platform Architecture

Figure 4:
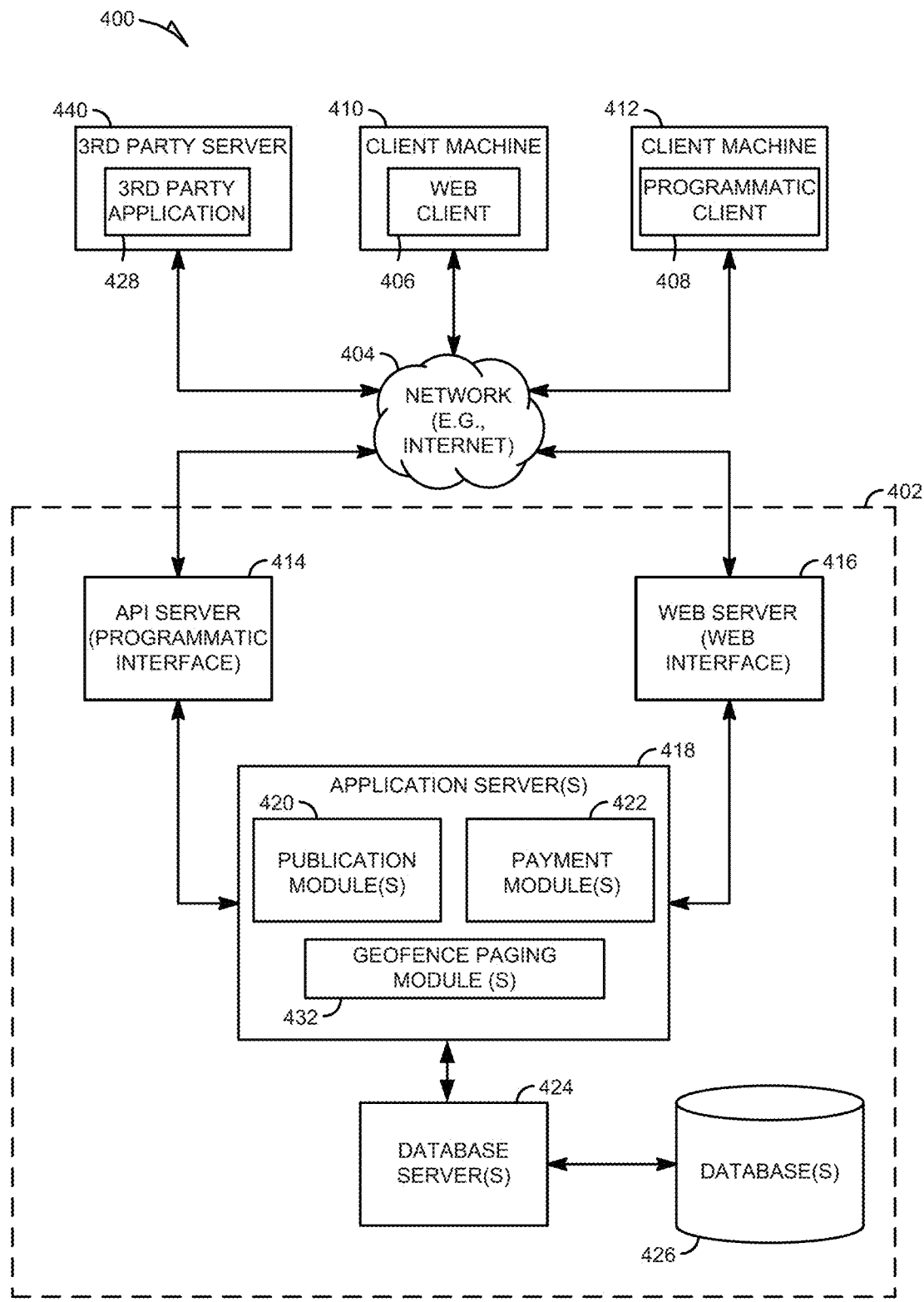
FIG. 4 is a block diagram illustrating a network-based system 400 within which passive dynamic geofencing can operate, according to an example embodiment.

FIG. 4 is a block diagram illustrating a network-based system 400 within which passive dynamic geofencing can operate, according to an example embodiment. The block diagram depicts a network-based system 400 (in the exemplary form of a client-server system), within which an example embodiment can be deployed. A networked system 402 is shown, in the example form of a network-based location-aware publication or payment system, that provides server-side functionality, via a network 404 (e.g., the Internet or WAN) to one or more client machines 410, 412. FIG. 4 illustrates, for example, a web client 406 (e.g., a browser, such as the Internet Explorer browser developed by Microsoft Corporation of Redmond, Wash. State) and a programmatic client 408 (e.g., PAYPAL payments smart phone application from PayPal, Inc. of San Jose Calif.) executing on respective client machines 410 and 412. In an example, the client machines 410 and 412 can be in the form of a mobile device, such as mobile device 115. In yet another example, the programmatic client 408 can be the RedLaser mobile shopping application from eBay, Inc. of San Jose, Calif.

An Application Programming Interface (API) server 414 and a web server 416 are coupled to, and provide programmatic and web interfaces respectively to, one or more application servers 418. The application servers 418 host one or more publication modules 420 (in certain examples, these can also include commerce modules, advertising modules, and marketplace modules, to name a few), payment modules 422, and geofence paging modules 432. The application servers 418 are, in turn, shown to be coupled to one or more database servers 424 that facilitate access to one or more databases 426. In some examples, the application server 418 can access the databases 426 directly without the need for a database server 424.

The publication modules 420 may provide a number of publication functions and services to users that access the networked system 402. The payment modules 422 may likewise provide a number of payment services and functions to users. The payment modules 422 may allow users to accumulate value (e.g., in a commercial currency, such as the U.S. dollar, or a proprietary currency, such as "points") in accounts, and then later to redeem the accumulated value for products (e.g., goods or services) that are advertised or made available via the various publication modules 420, within retail locations, or within external online retail venues. The payment modules 422 can also be configured to facilitate payment processing based on geofence detection and work in conjunction with the geofence paging modules 432. The geofence paging modules 432 may provide generation of parent and child geofences, among other things. While the publication modules 420, payment modules 422, and geofence paging modules 432 are shown in FIG. 4 to all form part of the networked system 402, it will be appreciated that, in alternative embodiments, the payment modules 422 may form part of a payment service that is separate and distinct from the networked system 402.

Further, while the system 400 shown in FIG. 4 employs a client-server architecture, the present invention is of course not limited to such an architecture, and could equally well find application in a distributed, or peer-to-peer, architecture system, for example. The various publication modules 420, payment modules 422, and geofence paging modules 432 could also be implemented as standalone systems or software programs, which do not necessarily have networking capabilities.

The web client 406 accesses the various publication modules 420, payment modules 422, and geofence paging modules 432 via the web interface supported by the web server 416. Similarly, the programmatic client 408 accesses the various services and functions provided by the publication modules 420, payment modules 422, and geofence paging modules 432 via the programmatic interface provided by the API server 414. The programmatic client 408 may, for example, be a smart phone application (e.g., the PAYPAL payments application) that enables users to process payments directly from their smart phones leveraging user profile data and current location information provided by the smart phone or accessed over the network 404.

FIG. 4 also illustrates a third party application 428, executing on a third party server machine 440, as having programmatic access to the networked system 402 via the programmatic interface provided by the API server 414. For example, the third party application 428 may, utilizing information retrieved from the networked system 402, support one or more features or functions on a website hosted by the third party. The third party website may, for example, provide one or more promotional, marketplace or payment functions that are supported by the relevant applications of the networked system 402. Additionally, the third party website may provide merchants with access to the geofence paging modules 432 for advertising or marketing purposes.

Example Authorization Modules

Figure 5:
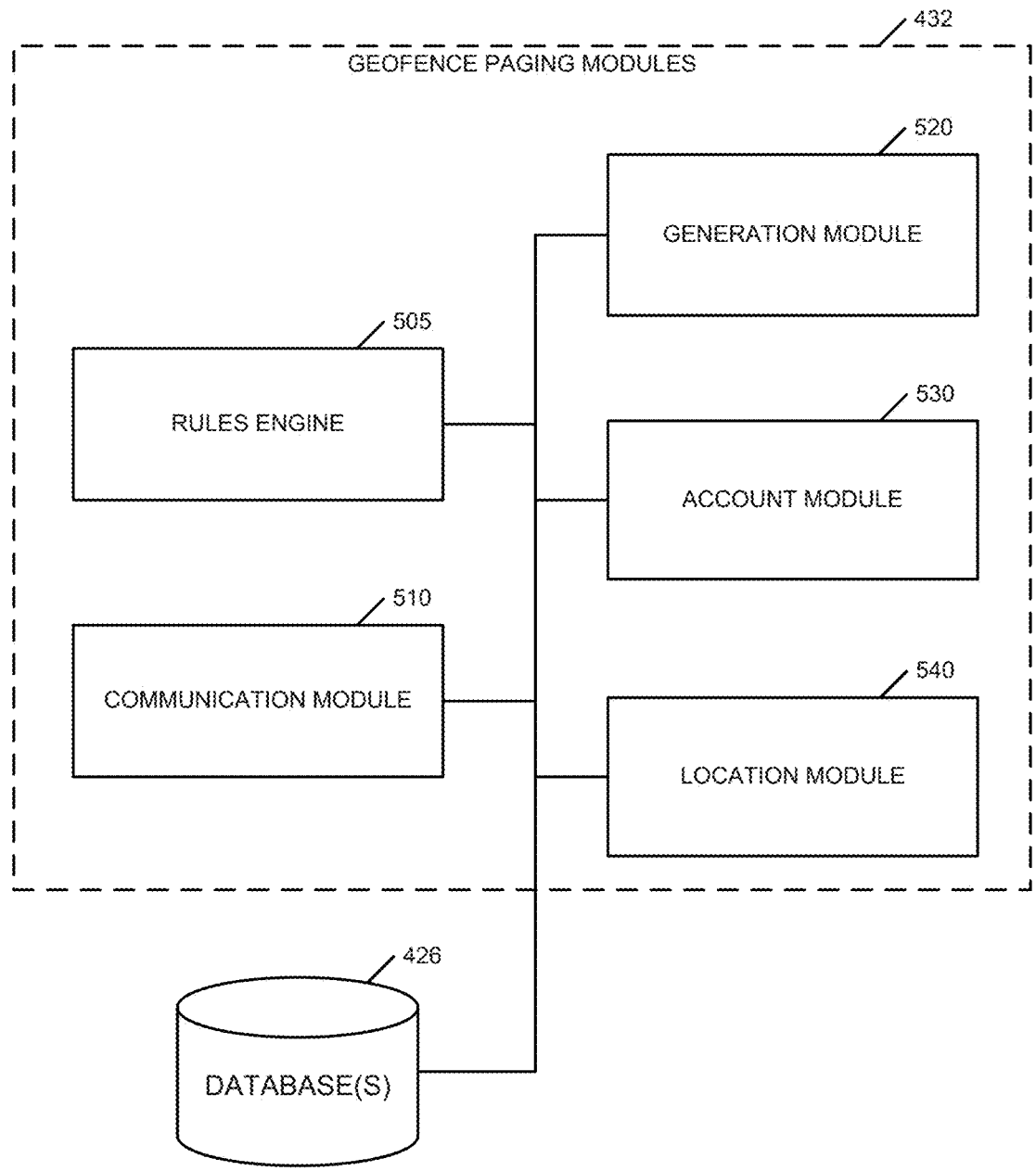
FIG. 5 is a block diagram illustrating geofence paging modules, according to an example embodiment.

FIG. 5 is a block diagram illustrating geofence paging modules 432, according to an example embodiment. In this example, the geofence paging modules 432 can include a rules engine 505, a communication module 510, a generation module 520, an account module 530, and a location module 540. In an example, the geofence paging modules 432 can access database 426 to store and/or retrieve generation rules, user profile data, location data, and geofences (parent and child), as well as other information, to enable passive dynamic geofencing.

In an example, the rules engine 505 can be configured to manage and evaluate rules controlling parent and child geofence generation. In an example, the rules engine 505 can enforce rules requiring the plurality of child geofences associated with a parent geofence be geographically related to the parent geofence. As discussed in reference to FIGS. 6A-6B, a child geofence does not necessarily need to be included completely within the geographic boundaries of the parent geofence. In another example, the rules engine 505 can require that the child geofences be completely contained within the geographic boundaries of the parent geofence.

In an example, the communication module 510 can be configured to manage communications between the geofence paging modules 432 and a user, where the user is communicating via the mobile device 115 or the client 140. The communication module 510 can also be configured to manage communications between the geofence paging modules 432 and a merchant, such as merchant server 280.

In an example, the generation module 520 is configured to generate parent and child geofences according to information provided by modules, such as the account module 530, the location module 540 and the rules engine 505.

In an example, the account module 530 is configured to provision (setup) and manage a user account on the networked system 402. In certain examples, the account module 530 can provision a user account according to configuration data received by the communication module 510. The account module 530 can also work in conjunction with the rules engine 505 in provisioning or decommissioning user accounts.

In an example, the location module 540 is configured to receive location data from a mobile device, such as mobile device 115, and determine from the location data a current physical location, which may include reference to landmarks or other sites of interest. In some examples, the location module 540 can receive GPS-type coordinates (e.g., longitude and latitude), which can be used to establish a current location associated with a mobile device (and, thus, a user of the mobile device). Using the longitude and latitude coordinates, the location module 540 can determine if the current location is within the current parent geofence, for example. In certain examples, the location module 540 can receive other location determining information from a mobile device, such as a photograph or scan of data only readily available at a certain physical location (generally referred to as a secondary location authentication factor). In another example, some merchants may broadcast specific wireless network signals that can be received by a mobile device, such as mobile device 115. Once received, the mobile device 115 can include programming or circuitry to translate the signal into a specific location, or the mobile device 115 can simply retransmit the unique signal to the location module 540. In an example, a merchant location can transmit a unique SSID, which the location module can be programmed to interpret as identifying a specific merchant location. In another example, the merchant may broadcast a unique SSID within all of its locations and the location module 540 can be programmed to use a combination of the unique SSID and other location data (e.g., GPS coordinates or cell tower locations) to identify a specific location Additional details regarding the functionality provided by the location-aware geofence paging modules 432 are detailed in reference to FIGS. 6-8.

Example Geofence Pages

Figure 6A:
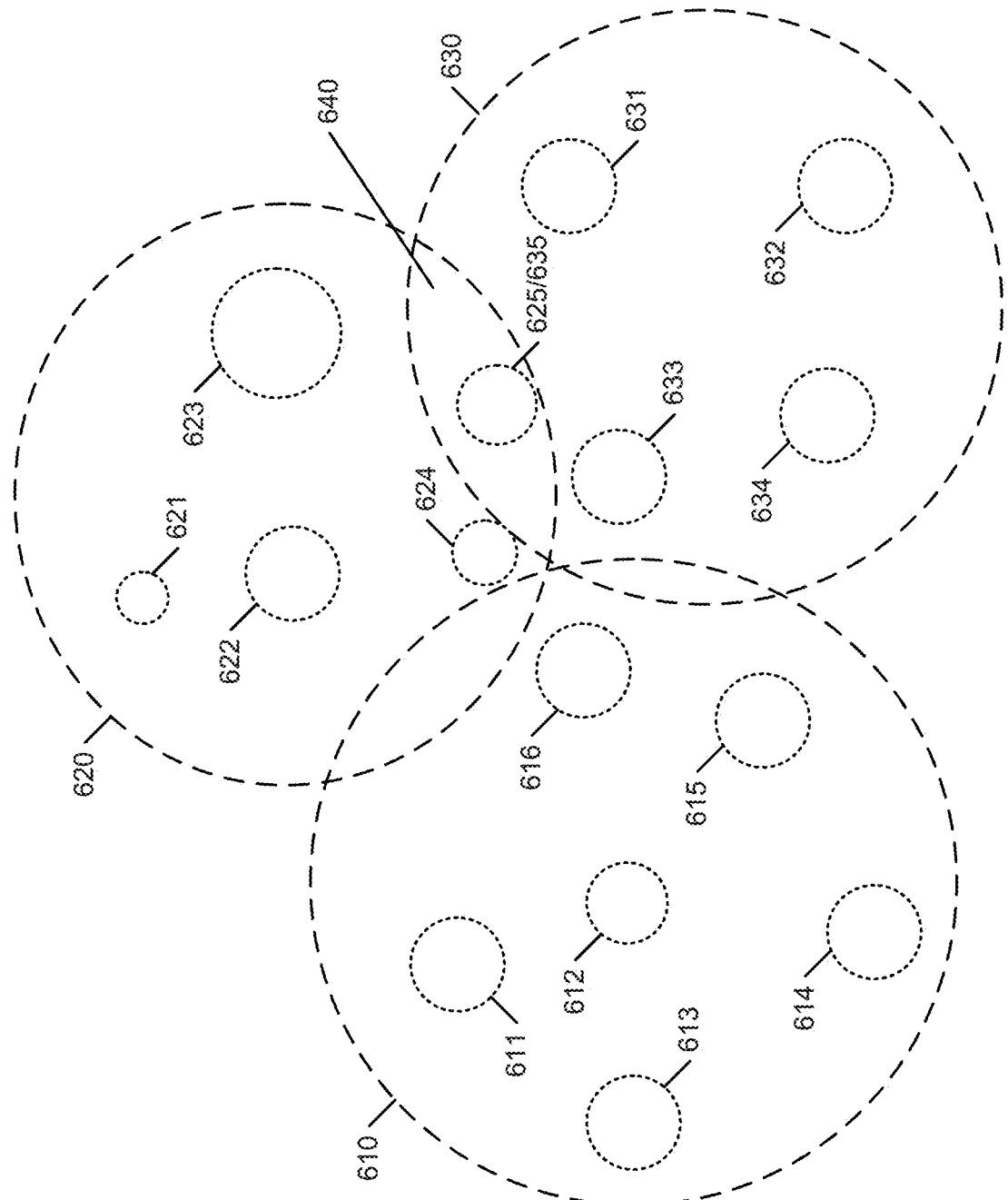
FIG. 6A is a block diagram illustrating example parent and child geofences, according to an example embodiment.

FIG. 6A is a block diagram illustrating example parent and child geofences, according to an example embodiment. In this example, a parent geofence, such as geofence 610, 620 or 630, can include multiple child geofences, such as child geofences 611, 612, 616. The child geofences can be of various sizes or shapes; FIG. 6A illustrates all geofences as circles solely by way of example. Both the parent and child geofences can be described by geo-location data, such as a latitude, longitude, and radius in the circular geofence examples. In other example, multiple geo-location points (latitude, longitude) pairs can be used to create a bounding box. In yet other examples, a series of geo-location points can be used to create an irregular shape. Additionally, other methods known in the art for describing a bounding box can be utilized to store geofence data within a system, such as the networked system 402.

In an example, a child geofence can be associated with multiple parent geofences. For example, child geofence 625/635 can belong to both parent geofence 620 and parent geofence 630. Accordingly, if a mobile device, such as mobile device 115, is geographically located within parent geofence 620, then parent geofence 620 and child geofences (621, 622, 623, 624, and 625/635) can be active in memory. When the mobile device moves into a geographic area covered by parent geofence 630 (and not covered by parent geofence 620), then the parent geofence 630 and child geofences (631-634) can be loaded into active memory, with child geofence 625/635 remaining in active memory. In certain examples, when mobile device 115 is geographically located within an overlap zone, such as overlap zone 640 (created by the overlap in parent geofence 620 with parent geofence 630), the mobile device 115 can load child geofences from both parent geofences (e.g., child geofences 621-625 and 631-635) into active memory. In some examples, a parent geofence, such as parent geofence 630, can include a child geofence that intersects (or nearly intersects) the boundary of the parent geofence, such as child geofence 624. In yet other examples, a parent geofence, such as parent geofence 610, can be configured to include a child geofence with a boundary within a pre-defined distance of the parent geofence boundary, such as child geofence 624.

Figure 6B:
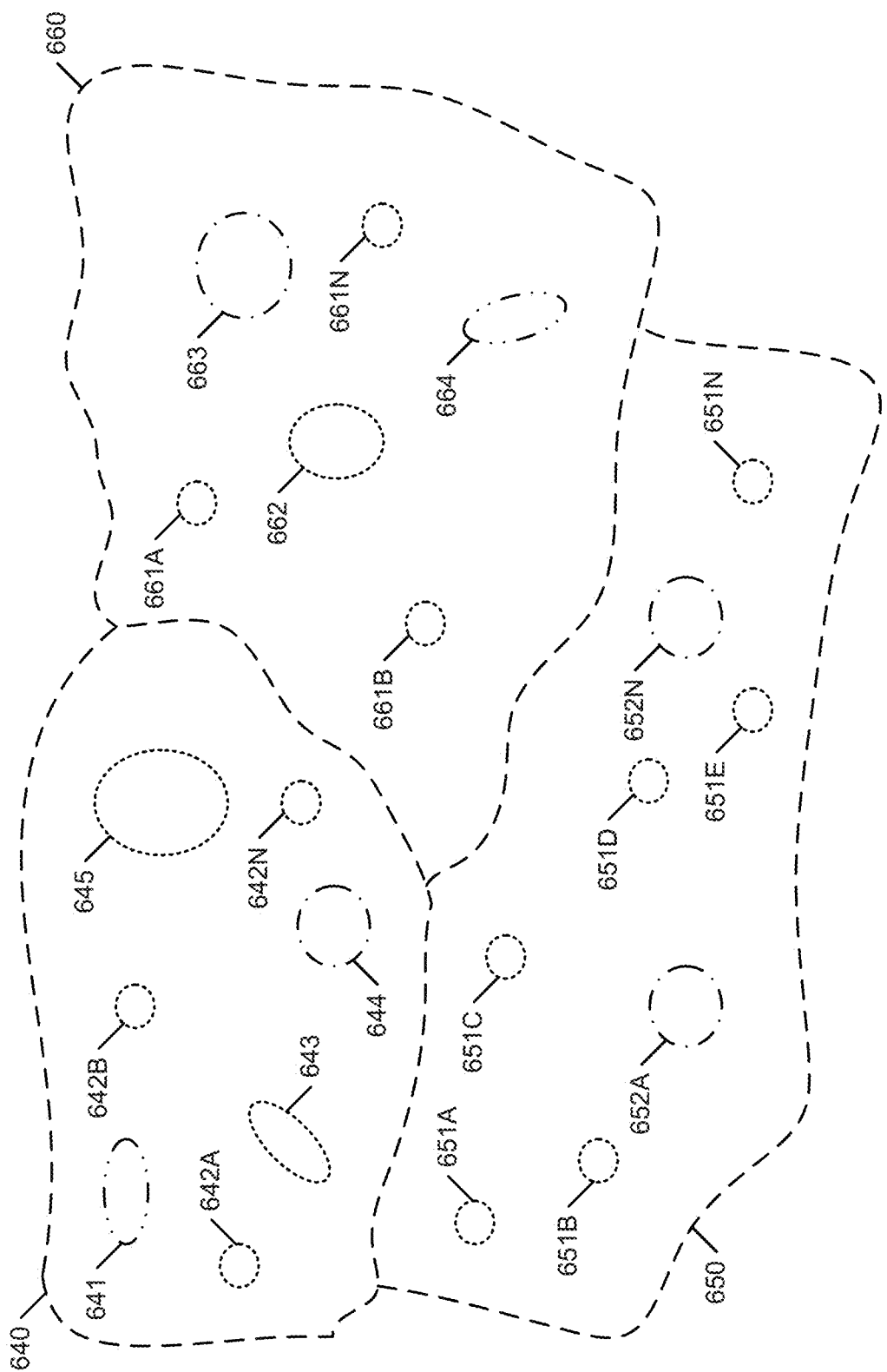
FIG. 6B is a block diagram illustrating example parent and child geofences, according to an example embodiment.

FIG. 6B is a block diagram illustrating example parent and child geofences, according to an example embodiment. FIG. 6B is intended to illustrate at least a couple additional aspects of parent and child geofences. First, FIG. 6B illustrates irregular shaped parent geofences, such as parent geofence 640. Second, FIG. 6B illustrates child geofences of various types. Compare child geofence 641 with child geofence 642A-642N (commonly referred to as child geofence 642). Geofences, both parent and child, can include various metadata fields that can be used to store additional descriptive information that can be used by either the mobile device 115 or the networked system 402 to perform different functions. For example, a geofence can include a merchant ID to indicate a particular retail store chain or advertiser on the networked system 402. In an example, child geofences 642 can represent a series of retail locations of a retail chain. A mobile application running on a mobile device, such as mobile device 115, can use child geofences 642 to determine when a user has moved, with mobile device 115, into a particular store location. In an example, the mobile application may be able to provide deals or inventory information specific to that location.

Example Methods

Figure 7:
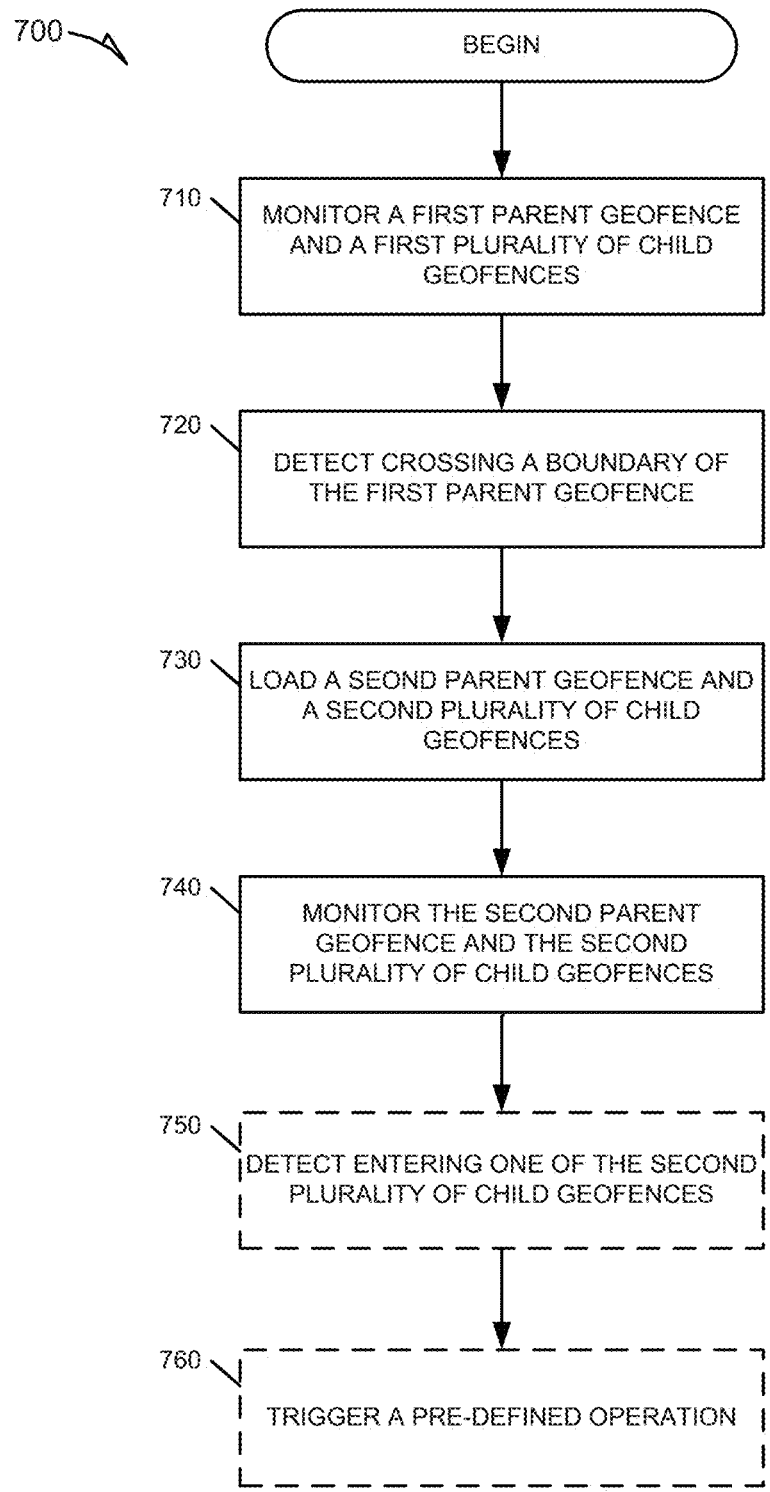
FIG. 7 is a flowchart illustrating a method of using passive dynamic geofencing on a mobile device, according to an example embodiment.

FIG. 7 is a flowchart illustrating a method 700 for using passive dynamic geofencing on a mobile device, according to an example embodiment. In an example, the method 700 can include operations for: monitoring a first parent geofence at 710, detecting crossing a boundary at 720, loading a second parent geofence at 730, and monitoring the second parent geofence at 740. Optionally, the method 700 can also include operations such as detecting entering one of a second plurality of child geofences at 750 and triggering a pre-defined operation at 760.

In an example, the method 700 can begin at 710 with the mobile device 115 monitoring a first parent geofence and a first plurality of child geofences. For instance, in reference to FIG. 6A, the mobile device 115 can monitor the parent geofence 610 and child geofences 611-616. Optionally, the method 700 can also include the mobile device 115 transmitting a list of physical locations of interest to the user. In this example, the list of physical locations can be transformed into one or more parent geofences each containing a plurality of child geofences. The child geofences representing physical location in the list of physical locations to be monitored by the mobile device 115. At 720, the method 700 can continue with the mobile device 115 detecting a location change indicating crossing over from the first parent geofence to a second parent geofence. In reference again to FIG. 6A, the mobile device 115 can detect when the location associated with the mobile device 115 moves from parent geofence 610 to parent geofence 620.

At 730, the method 700 can continue with the mobile device 115 loading, response to detecting presence within a second parent geofence, of the second parent geofence and a second plurality of child geofences. In some examples, the mobile device 115 only detects movement out of the first parent geofences and then determines a subsequent parent geofence based on a current location outside of the first parent geofence. In some examples, the mobile device 115 can send a request to a network-based system, such as networked system 402, to obtain a new parent geofence and a new plurality of child geofences to monitor. In other examples, the mobile device 115 can include a database of geofences (parent and child) and can query the database internally to determine the new parent and associated children to load. In an example, the mobile device 115 unloads the first parent geofence and the first plurality of child geofences prior to loading the second parent geofence and the second plurality of child geofences.

At 740, the method 700 can continue with the mobile device 115 monitoring a location associated with the mobile device 115 in reference to the second parent geofence and the second plurality of child geofences. Optionally, the method 700 can continue at 750 with the mobile device 115 detecting the current location associated with the mobile device 115 moving into (e.g., entering or crossing a boundary associated with) one of the second plurality of child geofences. For instance, the mobile device 115 can monitor a location in reference to the second plurality of geofences, which may represent retail locations, to determine when the mobile device 115 enters a monitored retail location. Finally, at 760, the method 700 can optionally include the mobile device 115 triggering a pre-defined operation in response to entering the one of the second plurality of child geofences. In an example, the pre-defined operation can include displaying a promotional message, sending a text or email message, changing a function of an application, or emitting an alert, among other things. The mobile device 115, or an application running on the mobile device 115, can be configured to perform any supported function in response to detecting entry into a child geofence. In an example, the operating system running on the mobile device 115 can include functionality for monitoring geofences and generating in an event upon detecting entry into a monitored geofence. The generated event can be processed by any application registered to received the event.

Figure 8:
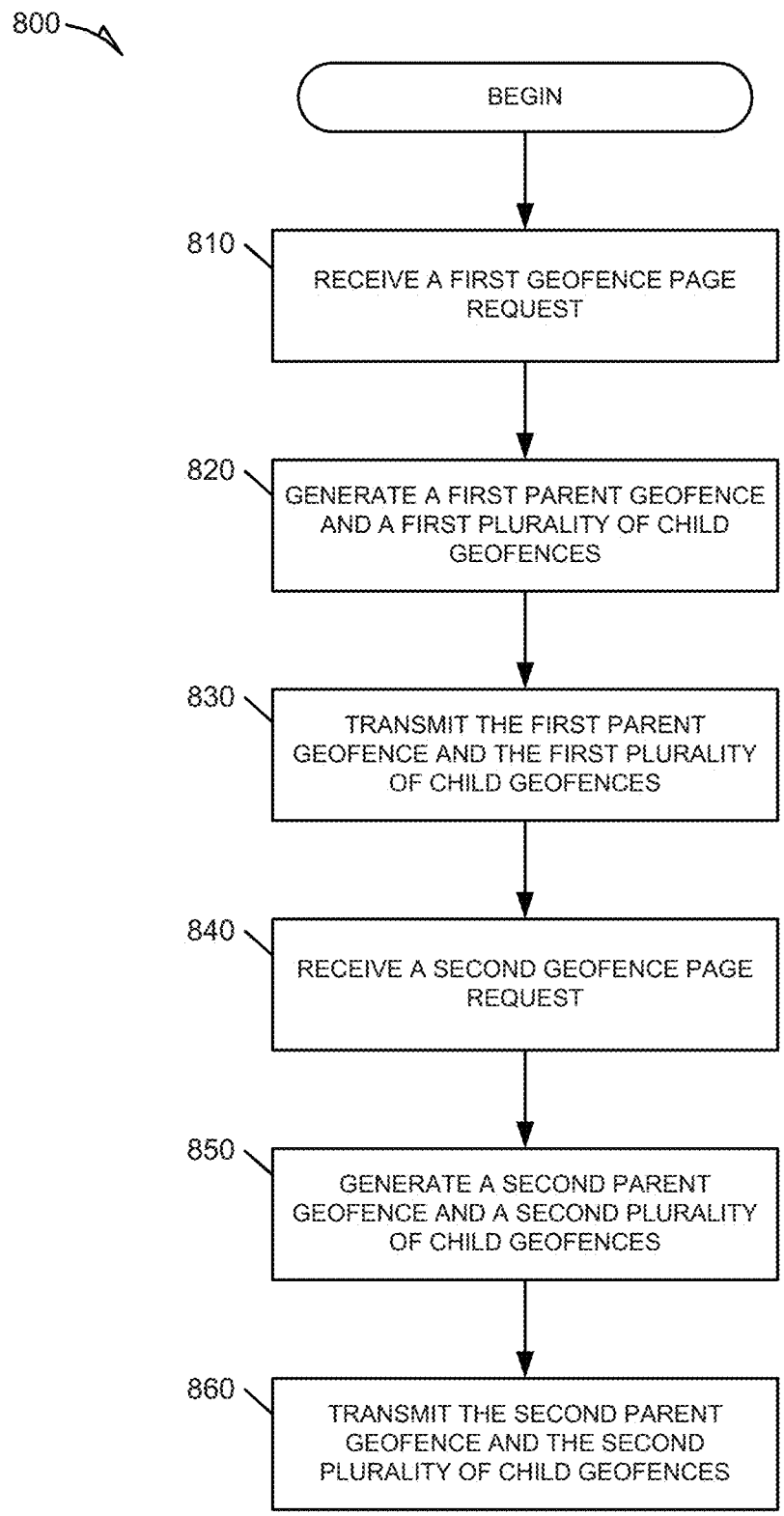
FIG. 8 is a flowchart illustrating a method of enabling a mobile device to use passive dynamic geofencing, according to an example embodiment.

FIG. 8 is a flowchart illustrating a method 800 of enabling a mobile device to use passive dynamic geofencing, according to an example embodiment. In an example, the method 800 can include operations for: receiving a geofence page request at 810, generating a parent and associated child geofences at 820, transmitting the parent and associated child geofences at 830, receiving a second geofence request at 840, generating a second parent and associated child geofences, and transmitting the second parent and associated child geofences at 860.

At 810, the method 800 can begin with networked system 402 receiving, from a mobile device, such as mobile device 115, a first geofence page request. In an example, the geofence page request can include a current location associated with the requesting mobile device. In certain examples, the geofence page request can also include an application or service identifier, as different mobile applications or services may be serviced by a single service provider.

At 820, the method 800 can continue with the networked system 402 generating, based at least in part on the geofence page request, a first parent geofence and a first plurality of child geofences. In these examples, the parent geofence can represent a page of geofences, thus the geofence page request can return a parent and a plurality of associated child geofences.

At 830, the method 800 can continue with the networked system 402 transmitting, over a network such as the Internet, the first parent geofence and the first plurality of child geofences associated with the first parent geofence. At 840, the method 800 can continue with the networked system 402 receiving a second geofence page request. At 850, the method 800 can continue with the networked system 402 generating a second parent geofence and a second plurality of child geofences associated with the second parent geofence. Finally, at 860, the method 800 can conclude with the networked system 402 transmitting the second parent geofence and the second plurality of child geofences in response to the request received from the mobile device 115.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connects the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Electronic Apparatus and System

Example embodiments may be implemented in digital electronic circuitry, or in computer hardware, firmware, software, or in combinations of these. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and
Machine-Readable Medium

Figure 9:
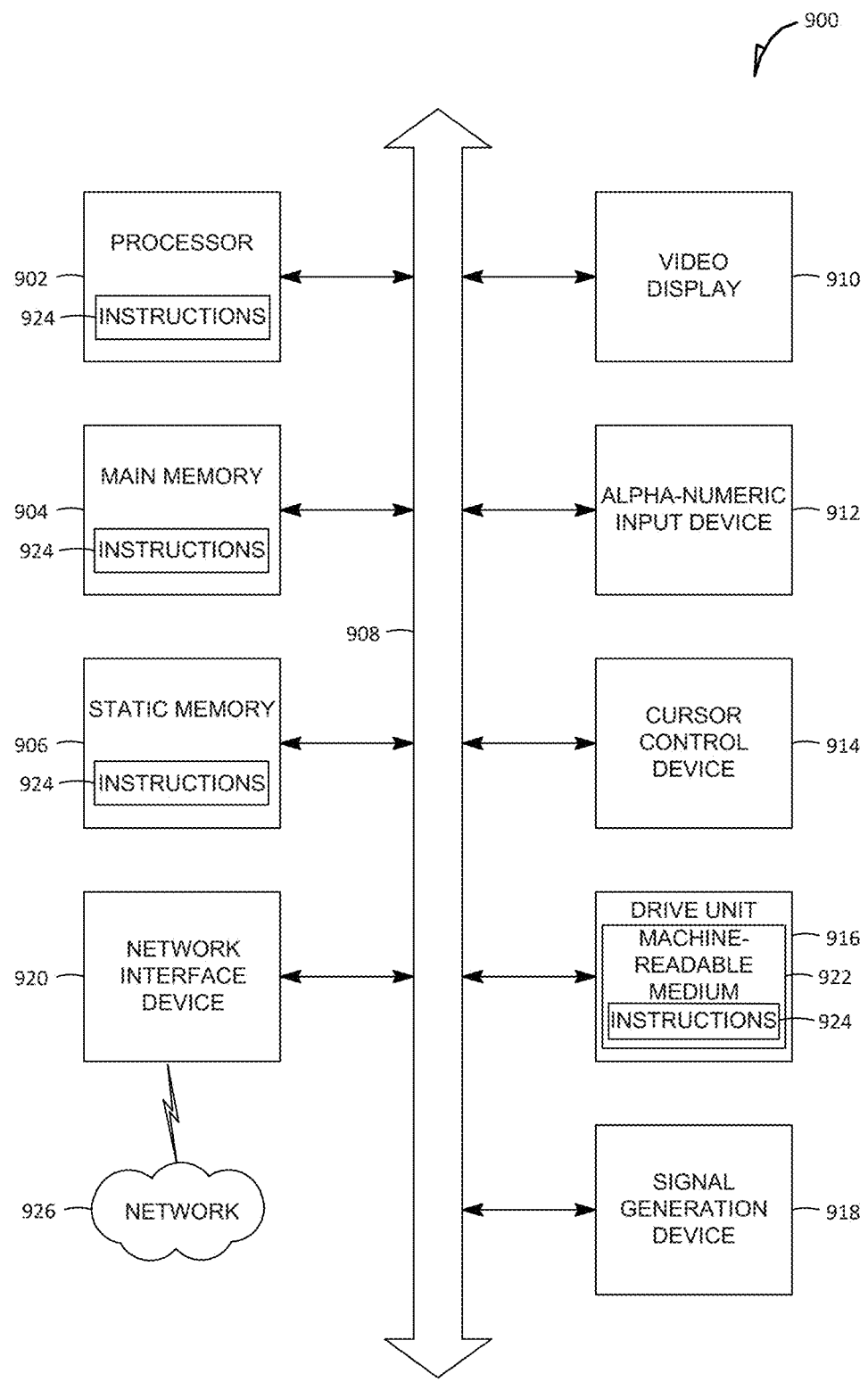
FIG. 9 is a diagrammatic representation of a machine in the example form of a computer system within which a set of instructions for causing the machine to perform any one or more of the methodologies discussed herein may be executed.

FIG. 9 is a block diagram of a machine in the example form of a computer system 900 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a PDA, a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU) or both), a main memory 904 and a static memory 906, which communicate with each other via a bus 908. The computer system 900 may further include a video display unit 910 (e.g., a liquid crystal displays (LCD) or a cathode ray tube (CRT)). The computer system 900 also includes an alphanumeric input device 912 (e.g., a keyboard), a cursor control (user interface (UI) navigation) device 914 (e.g., a mouse), a disk drive unit 916, a signal generation device 918 (e.g., a speaker) and a network interface device 920.

Machine-Readable Medium

The disk drive unit 916 includes a machine-readable medium 922 on which is stored one or more sets of instructions and data structures (e.g., software) 924 embodying or used by any one or more of the methodologies or functions described herein. The instructions 924 may also reside, completely or at least partially, within the main memory 904, static memory 906, and/or within the processor 902 during execution thereof by the computer system 900, with the main memory 904 and the processor 902 also constituting machine-readable media.

While the machine-readable medium 922 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures used by or associated with such instructions. The term "machine-readable medium" shall accordingly be taken to include, but not be limited to, solid-state memories and optical and magnetic media. Specific examples of machine-readable media include non-volatile memory, including by way of example, semiconductor memory devices (e.g., Erasable Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

Transmission Medium

The instructions 924 may further be transmitted or received over a communications network 926 using a transmission medium. The instructions 924 may be transmitted using the network interface device 920 and any one of a number of well-known transfer protocols (e.g., HTTP). Examples of communication networks include a LAN, a WAN, the Internet, mobile telephone networks, Plain Old Telephone (POTS) networks, and wireless data networks (e.g., WiFi and WiMAX networks). The term "transmission medium" shall be taken to include any intangible medium that is capable of storing, encoding or carrying instructions for execution by the machine, and includes digital or analog communications signals or other intangible media to facilitate communication of such software.

Thus, a method and system for passive dynamic geofencing been described. Although the present invention has been described with reference to specific example embodiments, it will be evident that various modifications and changes may be made to these embodiments without departing from the broader scope of the invention. Accordingly, the specification and drawings are to be regarded in an illustrative rather than a restrictive sense.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document, for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed The claimed invention includes:

1. A method comprising:

transmitting a first geofence page request, the first geofence page request including first location data that identifies a first location of a client device;

loading a first geofence page at the client device based on the first geofence page request, the first geofence page including a first child geofence that encompass physical locations proximate to the first location of the client device, and a first parent geofence having a first boundary that encompasses the first child geofence;

detecting the client device outside the boundary of the first parent geofence based on a second location of the client device;

causing the client device to transmit a second geofence page request in response to the detecting the client device outside the boundary, the second geofence page request including second location data that identifies the second location of the client device;

unloading the first parent geofence and the first child geofence of the first geofence page from the client device in response to the causing the client device to transmit the second geofence page request;

loading a second geofence page at the client device based on the second geofence page request, the second geofence page including a second child geofence proximate to the second location of the client device, and a second parent geofence having a second boundary that encompasses the second child geofence; and triggering an operation at the client device in response to the client device entering the second child geofence.

2. The method of claim 1, wherein the first geofence page request includes an indication of a location of interest, and wherein the first child geofence of the first geofence page is associated with the location of interest.

3. The method of claim 1, wherein the method further comprises:

triggering a pre-defined operation at the client device in response to the loading the first geofence page at the client device.

4. The method of claim 3, wherein the pre-defined operation includes causing display of a notification at the client device.

5. The method of claim 3, wherein the pre-defined operation includes activating an application associated with the first geofence page at the client device.

6. The method of claim 1, wherein the unloading of the first geofence page at the client device occurs prior to loading the second geofence page.

7. The method of claim 2, wherein the location of interest comprises a store.

8. A non-transitory machine-readable medium comprising instructions that, when executed on a client device, cause the client device to perform operations comprising:

transmitting a first geofence page request, the first geofence page request including first location data that identifies a first location of a client device;

loading a first geofence page at the client device based on the first geofence page request, the first geofence page including a first child geofence that encompass physical locations proximate to the first location of the client device, and a first parent geofence having a first boundary that encompasses the first child geofence;

detecting the client device outside the boundary of the first parent geofence based on a second location of the client device;

causing the client device to transmit a second geofence page request in response to the detecting the client device outside the boundary, the second geofence page request including second location data that identifies the second location of the client device;

unloading the first parent geofence and the first child geofence of the first geofence page from the client device in response to the causing the client device to transmit the second geofence page request;

loading a second geofence page at the client device based on the second geofence page request, the second geofence page including a second child geofence proximate to the second location of the client device, and a second parent geofence having a second boundary that encompasses the second child geofence; and triggering an operation at the client device in response to the client device entering the second child geofence.

9. The non-transitory machine-readable storage medium of claim 8, wherein the instructions cause the client device to perform operations further comprising:

triggering a pre-defined operation at the client device in response to the loading the first geofence page at the client device.

10. The non-transitory machine-readable storage medium of claim 9, wherein the pre-defined operation includes causing display of a notification at the client device.

11. The non-transitory machine-readable storage medium of claim 9, wherein the pre-defined operation includes activating an application associated with the first geofence page at the client device.

12. The non-transitory machine-readable storage medium of claim 8, wherein the unloading of the first geofence page at the client device occurs prior to loading the second geofence page.

13. A system comprising: one or more processors; and a non-transitory memory storing instructions that configure the one or more processors to perform operations comprising:

tranmitting a first geofence page request, the first geofence page request including first location data that identifies a first location of a client device;

loading a first geofence page at the client device based on the first geofence page request, the first geofence page including a first child geofence that encompass physical locations proximate to the first location of the client device, and a first parent geofence having a first boundary that encompasses the first child geofence;

detecting the client device outside the boundary of the first parent geofence based on a second location of the client device;

causing the client device to transmit a second geofence page request in response to the detecting the client device outside the boundary, the second geofence page request including second location data that identifies the second location of the client device;

unloading the first parent geofence and the first child geofence of the first geofence page from the client device in response to the causing the client device to transmit the second geofence page request;

loading a second geofence page at the client device based on the second geofence page request, the second geofence page including a second child geofence proximate to the second location of the client device, and a second parent geofence having a second boundary that encompasses the second child geofence; and triggering an operation at the client device in response to the client device entering the second child geofence.

14. The non-transitory machine-readable storage medium of claim 8, wherein the first geofence page request includes an indication of a location of interest, and wherein the first child geofence of the first geofence page is associated with the location of interest, wherein the location of interest comprises a store.

15. The system of claim 13, wherein the instructions cause the system to perform operations further comprising:

triggering a pre-defined operation at the client device in response to the loading the first geofence page at the client device.

16. The system of claim 15, wherein the pre-defined operation includes causing display of a notification at the client device.

17. The system of claim 15, wherein the pre-defined operation includes activating an application associated with the first geofence page at the client device.

18. The system of claim 13, wherein the unloading of the first geofence page at the client device occurs prior to loading the second geofence page.

19. The system of claim 13, wherein the first geofence page request includes an indication of a location of interest, and wherein the first child geofence of the first geofence page is associated with the location of interest, wherein the location of interest comprises a store.

20. The system of claim 19, wherein the store is defined by way of a user account.

* * * * *